United States Patent
Rockwell et al.

(10) Patent No.: US 9,639,344 B2
(45) Date of Patent: May 2, 2017

(54) TELEMATICS UPDATE SOFTWARE COMPATIBILITY

(71) Applicant: Ford Global Technologies, LLC, Dearborn, MI (US)

(72) Inventors: Mark Anthony Rockwell, Wyandotte, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/567,470

(22) Filed: Dec. 11, 2014

(65) Prior Publication Data

US 2016/0170775 A1    Jun. 16, 2016

(51) Int. Cl.
*G06F 9/44* (2006.01)
*G06F 9/445* (2006.01)
*G06F 13/42* (2006.01)

(52) U.S. Cl.
CPC .......... *G06F 8/65* (2013.01); *G06F 9/44536* (2013.01); *G06F 13/4282* (2013.01)

(58) Field of Classification Search
CPC .............................................. G06F 8/68–8/77
USPC ................................................. 717/168–178
See application file for complete search history.

(56) References Cited

U.S. PATENT DOCUMENTS

| | | | | |
|---|---|---|---|---|
| 7,366,589 B2* | 4/2008 | Habermas | ................. | G06F 8/65 701/1 |
| 7,421,321 B2* | 9/2008 | Breed | ..................... | B60C 11/24 340/442 |
| 8,561,052 B2* | 10/2013 | Kogan | ..................... | G06F 8/65 717/170 |
| 8,655,541 B2* | 2/2014 | You | ......................... | H04L 67/34 340/438 |
| 8,813,061 B2* | 8/2014 | Hoffman | .................. | G06F 8/65 717/168 |
| 8,942,885 B2* | 1/2015 | Yun | ........................ | G07C 5/008 701/1 |

(Continued)

OTHER PUBLICATIONS

Secure Firmware Updates over the Air in Intelligent Vehicles—Dennis K. Nilsson and Ulf E. Larson—Department of Computer Science and Engineering Chalmers University of Technology,Gothenburg, Sweden—IEEE Communications Society subject matter experts for publication in the ICC 2008 workshop proceedings—2008.*

*Primary Examiner* — Francisco Aponte
(74) *Attorney, Agent, or Firm* — Jennifer M. Stec; Brooks Kushman P.C.

(57) ABSTRACT

A vehicle may receive a software update to be installed to a vehicle electronic control unit (ECU); perform compatibility testing for vehicle ECUs according to tokens from the vehicle ECUs indicating respective software version levels of the vehicle ECUs to determine a compatibility result; and switch the software update into active use on the vehicle when the compatibility result indicates an allowable configuration of software version levels. A vehicle ECU may receive tokens from other of the vehicle ECUs indicating respective software version levels of the other vehicle ECUs; determine whether the ECU is the most up-to-date ECU based on the tokens; and if so, determine a compatibility result indicative of compatibility of the version levels, or otherwise, receive the compatibility result from the ECU that is the most up-to-date.

20 Claims, 5 Drawing Sheets

(56) References Cited

U.S. PATENT DOCUMENTS

| | | | | |
|---|---|---|---|---|
| 9,020,697 B2* | 4/2015 | Ricci | | H04W 48/04 |
| | | | | 701/36 |
| 9,152,408 B2* | 10/2015 | Murata | | H02J 7/041 |
| 9,464,905 B2* | 10/2016 | Lewis | | G01C 21/32 |
| 2005/0216902 A1 | 9/2005 | Schaefer | | |
| 2007/0112773 A1* | 5/2007 | Joyce | | G06F 8/64 |
| 2008/0140278 A1* | 6/2008 | Breed | | G07C 5/008 |
| | | | | 701/31.4 |
| 2009/0119657 A1* | 5/2009 | Link, II | | G06F 8/65 |
| | | | | 717/171 |
| 2009/0287499 A1* | 11/2009 | Link, II | | G06Q 30/018 |
| | | | | 705/317 |
| 2010/0048193 A1* | 2/2010 | Ortion | | G06F 8/60 |
| | | | | 455/418 |
| 2010/0146497 A1 | 6/2010 | Kogan et al. | | |
| 2010/0228404 A1* | 9/2010 | Link, II | | G06F 9/44542 |
| | | | | 701/1 |
| 2011/0197187 A1* | 8/2011 | Roh | | G06F 8/65 |
| | | | | 717/173 |
| 2011/0307879 A1* | 12/2011 | Ishida | | G06F 8/68 |
| | | | | 717/170 |
| 2014/0006555 A1* | 1/2014 | Shields | | H04L 67/12 |
| | | | | 709/217 |
| 2014/0245278 A1 | 8/2014 | Zellen | | |
| 2014/0282470 A1* | 9/2014 | Buga | | G06F 8/65 |
| | | | | 717/170 |
| 2014/0343753 A1* | 11/2014 | Kirsch | | G07C 5/008 |
| | | | | 701/2 |
| 2015/0113520 A1* | 4/2015 | Kotani | | G06F 8/65 |
| | | | | 717/172 |
| 2015/0128123 A1* | 5/2015 | Eling | | G06F 8/67 |
| | | | | 717/171 |
| 2015/0234767 A1* | 8/2015 | Tatge | | G06F 13/4027 |
| | | | | 710/306 |
| 2015/0242198 A1* | 8/2015 | Tobolski | | G06F 8/61 |
| | | | | 717/172 |
| 2015/0339114 A1* | 11/2015 | Rockwell | | G06F 8/65 |
| | | | | 701/1 |

* cited by examiner

TELEMATICS UPDATE SOFTWARE COMPATIBILITY

TECHNICAL FIELD

Aspects of the disclosure relate to ensuring software compatibility of software updates to a vehicle component with software versions installed to other vehicle components.

BACKGROUND

To update a software version of a component of a vehicle, the vehicle may be driven to a dealership and serviced by a technician. The technician may utilize a system that tracks the individual software levels of components in the vehicle as well as available software updates. The technician may manually apply the software updates indicated by the system and record any changes back into the system. The software update may be done while the vehicle is inoperable.

SUMMARY

In a first illustrative embodiment, a vehicle system includes a vehicle electronic control unit (ECU) of a plurality of ECUs configured to receive tokens from other of the vehicle ECUs indicating respective software version levels of the other vehicle ECUs; determine whether the ECU is a most up-to-date ECU based on the tokens; and if so, determine a compatibility result indicative of compatibility of the version levels, or otherwise, receive the compatibility result from the ECU that is the most up-to-date.

In a second illustrative embodiment, a computer-implemented method for a vehicle includes receiving a software update to be installed to a vehicle electronic control unit (ECU); performing software update compatibility testing to determine a compatibility result according to module identifiers and tokens from other vehicle ECUs indicating respective software version levels of the vehicle ECUs; and switching the software update into active use on the vehicle when the compatibility result indicates an allowable configuration with the software update installed.

In a third illustrative embodiment, a non-transitory computer-readable medium includes instructions that, when executed by at least one processor, are configured to cause the at least one processor to maintain a compatibility matrix indicating module identifiers of vehicle electronic control units (ECUs) and associated tokens that form a compatible vehicle software installation; receive, by a vehicle ECU, tokens from other vehicle ECUs indicating respective software version levels of the other vehicle ECUs; determine whether the vehicle ECUs is a most up-to-date electronic control unit (ECU) based on the tokens; and if so, determine a compatibility result indicative of compatibility of the version levels according to the tokens and the compatibility matrix, or otherwise, receive the compatibility result from the other vehicle ECU that is the most up-to-date.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As downloaded vehicle software updates become more widespread, the possibility of vehicle modules executing software versions that are incompatible with one another increases. Moreover, downloaded updates leave open the possibility for installation of malicious or unauthorized software updates. As a further consideration, a vehicle repair may introduce a vehicle module that is mechanically compatible with the vehicle, but has installed to it a software version that is incompatible with other vehicle modules.

An improved vehicle software update system may include a multi-module coordination feature (MMCF) configured to provide each vehicle module with an ability to provide governance over what software versions may be installed to the other modules. The MMCF feature may utilize a compatibility matrix from the most up-to-date module to determine whether a software update for a module is compatible with the software versions installed to the other modules of the vehicle. If the software update has been fully received and is compatible with the current software levels of the other vehicle modules, then the vehicle may install and activate the update (optionally upon customer acceptance if cost is involved). If, however, the vehicle identifies incompatibilities with the vehicle software, the vehicle may identify the modules that need to be updated to regain compatibility, and may further download those additional updates before installing and activating the new software updates.

By determining whether all the modules' software levels are compatible before switching the updates into active use on the vehicle, potential issues such as unauthorized updates, interrupted updates and basic flashing errors may be avoided. Moreover, as the system may validate the collection of vehicle module versions for compatibility utilizing information from the most up-to-date module, only approved combinations of software may be utilized by the vehicle, and any missed updates for a vehicle module may be automatically addressed.

Figure 1:
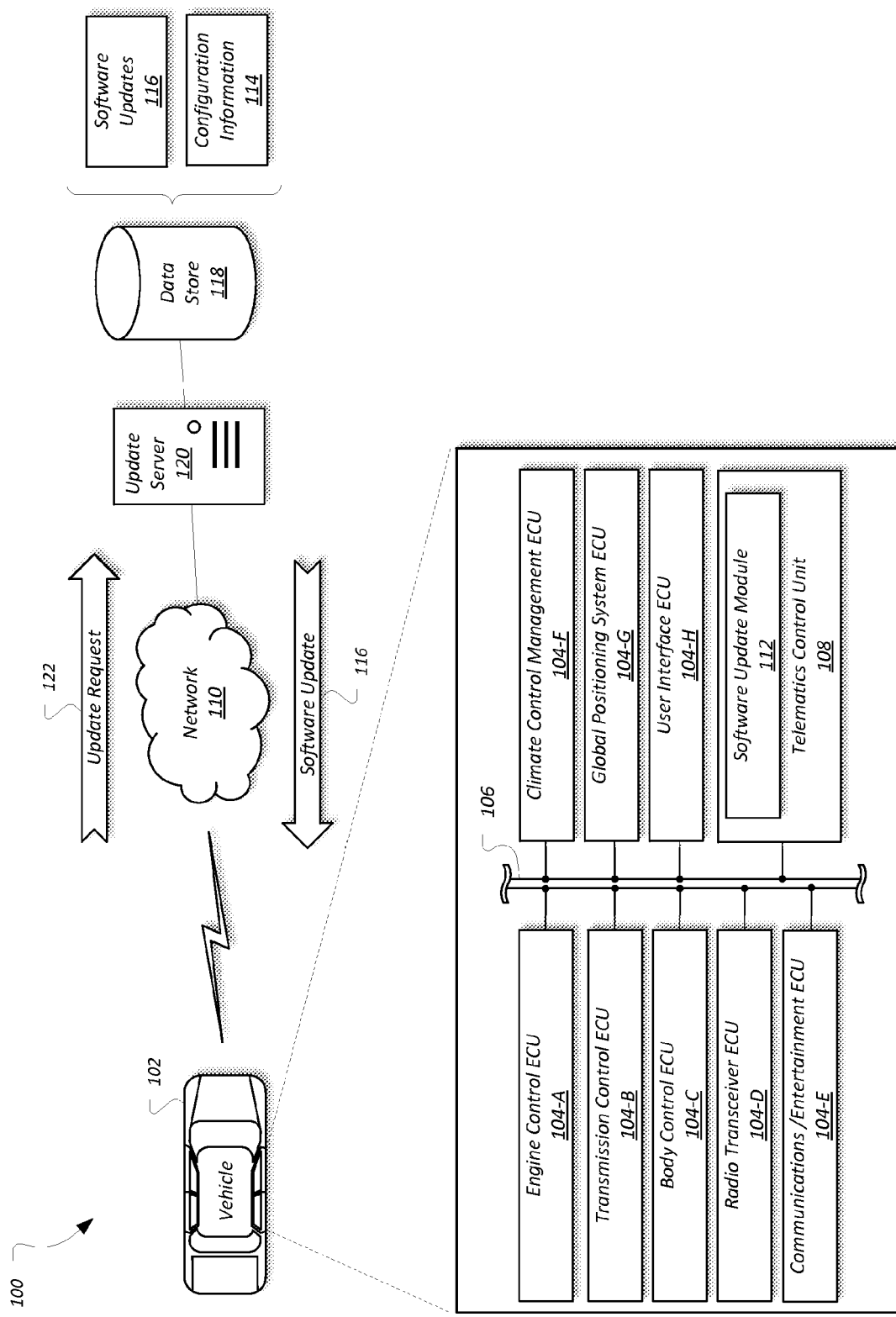
FIG. 1 illustrates an example system for providing software updates to a vehicle.

FIG. 1 illustrates an example system 100 for providing software updates 116 to a vehicle 102. The system 100 may include a telematics control unit 108 in communication over a network 110 with an update server 120 (e.g., via an in-vehicle modem, or via a data channel provided by mobile device of a vehicle occupant). The update server 120 may communicate with a data store 118 configured to maintain software updates 116 for download as well as vehicle configuration information 114 regarding the vehicles 102.

The telematics control unit 108 may include a software update module 112 configured to utilize the telematics control unit 108 to download software updates 116 for installation to the telematics control unit 108 or to other ECUs 104 of the vehicle 102. While an example system 100 is shown in FIG. 1, the example components illustrated in the Figure are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-H. However, the vehicle ECUs 104 may share physical hardware, firmware, and/or software, such that the functionality from multiple ECUs 104 may be integrated into a single ECU 104, and that the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: an engine control ECU 104-A may be configured to provide control of engine operating components; a transmission control ECU 104-B configured to utilize sensor data and data from the engine control ECU 104-A to calculate how and when to change gears in the vehicle 102 for optimum performance, fuel economy and shift quality; a body control ECU 104-C may be configured to manage various power control functions such as exterior lighting, interior lighting, keyless entry, remote start, and point of access status verification; a radio transceiver ECU 104-D may be configured to communicate with key fobs, mobile devices, or other local vehicle 102 devices; an entertainment control unit 104-E may be configured to support voice command and BLUETOOTH interfaces with the driver and driver carry-on devices; a climate control management ECU 104-F may be configured to provide control of heating and cooling system components (e.g., compressor clutch, blower fan, temperature sensors, etc.); a global positioning system (GPS) ECU 104-G may be configured to provide vehicle location information; and a human-machine interface (HMI) ECU 104-H may be configured to receive user input via various buttons or other controls, as well as provide vehicle status information to a driver.

The vehicle bus 106 may include various method of communication available between the vehicle ECUs 104, as well as between the telematics control unit 108 and the vehicle ECUs 104. As some non-limiting examples, the vehicle bus 106 may include one or more of a vehicle controller area network (CAN), an Ethernet network, and a media oriented system transfer (MOST) network. It should be noted that the illustrated bus topology is merely an example, and other number and arrangement of vehicle buses 106 may be used.

The telematics control unit 108 may include network hardware configured to facilitate communication between the vehicle ECUs 104 and with other devices of the system 100. For example, the telematics control unit 108 may include or utilize an in-vehicle cellular modem to facilitate communication over the communications network 110. The network 110 may include one or more interconnected communication networks such as the Internet, a cable television distribution network, a satellite link network, a local area network, a wide area network, and a telephone network, as some non-limiting examples. As another example, the telematics control unit 108 may utilize one or more of Bluetooth, Wi-Fi, and wired USB network connectivity to facilitate communication with the communications network 110 via the user's mobile device.

The software update management module 112 may be configured to utilize the telematics control unit 108 access the vehicle bus 106 to communicate with the vehicle ECUs 104. When a vehicle 102 is assembled, the vehicle 102 may include various hardware and software components. Upon or after assembly, the software update management module 112 may be configured to query for existence and version information for at least a portion of these hardware and software components of the vehicle ECUs 104 of the vehicle 102.

The software update management module 112 may be further configured to utilize the telematics control unit 108 to communicate with the update server 120 over the network 110. Using the queried information and additional information identifying the specific vehicle 102 (e.g., VIN information published on the CAN bus, subscriber identity module (SIM) information of the modem of the telematics control unit 108 such as international mobile station equipment identity (IMEI), etc.), the software update management module 112 may communicate via the network 110 to establish an account with the update server 120. The update server 120 may receive these communications from the vehicles 102, and may maintain a software data store 118 of vehicle configuration information 114 related to the received hardware configurations and software (e.g., firmware, etc.) versions linked to identifiers of the vehicles 102.

The software data store 118 may be further configured to store software updates 116 that may be provided to the vehicle 102. The software updates 116 may include changes to the software or settings of the vehicle 102 to address an issue with the current software or settings, or to provide improved functionality to the current software. The software updates 116 may include, for example, updated configuration settings for one or more vehicle ECUs 104, and/or updated versions of software or firmware to be installed on one or more vehicle ECUs 104. In some cases software updates 116 may include a single section, while in other cases a software updates 116 may be organized into multiple subsections, partitions, or chunks, where all the subsections may be downloaded to complete the overall software update 116 to be installed.

The software data store 118 may be further configured to store additional information about the software updates 116. For example, the software data store 118 may be configured to maintain an optional/required flag regarding the software updates 116 allowing the vehicles 102 to determine which software updates 116 are necessary and which are optional (e.g., an optional flag). As another example, the software data store 118 may be configured to maintain indications of which vehicle ECUs 104 are associated with which software updates 116. The software data store 118 may further store information indicative of the compatibility of the software updates 116 to vehicle model or configuration. For instance, a storage entry for a software update 116 may indicate that the software update 116 is compatible with a certain make and model of vehicle 102, or that it has a dependency on a version of another vehicle ECU 104 being of a particular version or versions.

The update server 120 may include one or more devices configured to serve the software updates 116 stored by the data store 118 to the vehicles 102. For example, the update server 120 may be configured to receive the update requests 122 for available software updates 116 from vehicles 102. The update requests 122 may include vehicle information to allow the update server 120 to query the data store 118 for software updates 116 applicable to the vehicle 102 as it is currently configured. The update server 120 may provide, responsive to the update requests 122, indications of software updates 116 (or the software updates 116 themselves) to update the requesting vehicle 102 that may be downloaded and installed. The update server 120 may be further configured to provide the software updates 116 to devices requesting to download the software updates 116 according to the provided indications.

The software update management module 112 may be further configured to manage the installation of software updates 116. For example, the vehicle 102 may receive a command from a user requesting to check for software updates 116. As another possibility, the vehicle 102 may trigger a periodic check for new software updates 116. When triggered, the vehicle 102 may be configured to send an update request 122 to the update server 120 to inquire whether software updates 116 for the vehicle 102 are available. For example, the vehicle 102 may query the update server 120 using the vehicle information (or, if the data store 118 maintains current vehicle information, an identifier of the vehicle 102), and may receive a response from the update server 120 indicative of whether new software updates 116 for the vehicle 102 are available (e.g., as links or other identifiers of software updates 116 for the vehicle 102 to download). The determination of whether new updates are available may be based, for example, on the configuration information 114 maintained for the requesting vehicle 102. If the response to the vehicle 102 indicates software updates 116 are available for the vehicle 102, the vehicle 102 may be further configured to utilize the telematics control unit 108 to download the indicated software updates 116, or in other cases queue the software updates 116 to be downloaded.

The software update management module 112 may be further configured to provide a user interface for managing the software updates 116 to the user. For example, the software update management module 112 may be configured to provide a prompt to the user (e.g., via a display or speaker of the user interface module 104-G) informing the user that software updates 116 are available and requesting permission to proceed with installation of the software updates 116. As another possibility, the software update management module 112 may be configured to provide an indication of available updates within the gauge cluster of the vehicle 102 when software updates 116 are available (e.g., downloaded).

Once the user confirms that the software updates 116 should be installed and/or upon other vehicle triggers such as key-on or key-off, the software update management module 112 may be configured to initiate various functions useful in support of the updating of the software of the vehicle ECUs 104. For example, the software update management module 112 may be configured to invoke a software update mode by providing a message from the software update management module 112 to the vehicle modules ECUs 104 over the vehicle bus 106. The software update management module 112 may be further configured to provide the software updates 116 to the vehicle ECUs 104 identified by the software updates 116 as recipients of the software updates 116 for validation and installation. The recipient vehicle ECUs 104 may accordingly receive the software updates 116 for compatibility testing and installation.

Figure 2:
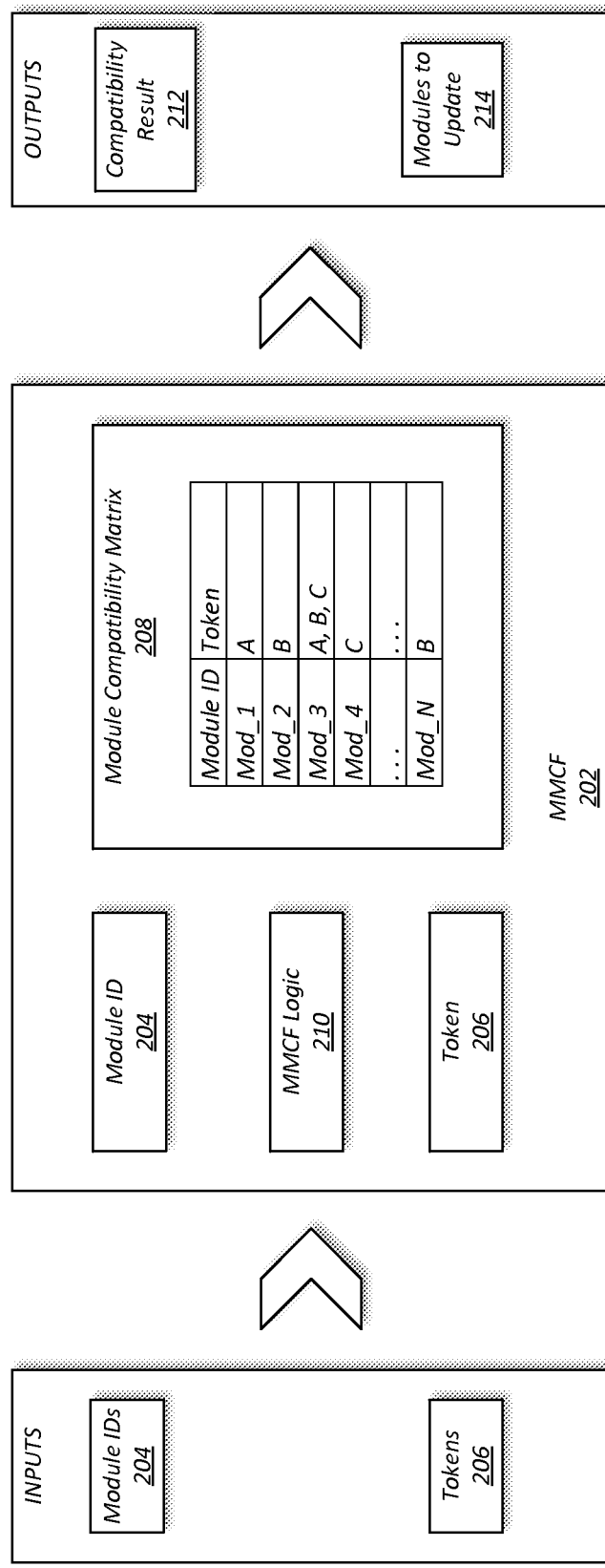
FIG. 2 illustrates an example multi-module coordination feature of a vehicle ECU configured to validate compatibility of a software update to be installed.

FIG. 2 illustrates an example multi-module coordination feature 202 of a vehicle ECU 104 configured to validate compatibility of a software update 116 to be installed. As shown, the multi-module coordination feature 202 includes a module identifier (ID) 204, a module token 206, a module compatibility matrix 208, and MMCF logic 210 configured to utilize the module ID 204, module token 206, and module compatibility matrix 208 to determine a configuration compatibility result 212 indicative of whether the software update 116 is compatible with the vehicle 102. In some cases, when the software update 116 is incompatible with the current software levels of the vehicle ECUs 104, determination of the compatibility result 212 may also include indications of additional modules to update 214 that, when installed, return the vehicle 102 to a compatible configuration.

As shown, the module ID 204 of the MMCF 202 may be an identifier of the vehicle ECU 104 that is unique within the vehicle bus 106 of the vehicle 102. In an example, the module ID 204 may be a part number of the vehicle ECU 104. As some other possibilities, the module ID 204 may be a random number or other identifier that is unique within the context of the vehicle 102 and identifiable as being associated with the particular vehicle ECU 104.

The module token 206 may be an identifier indicative of a version level of software installed to the vehicle ECU 104. In an example, the module token 206 may indicate an update level for the ECU 104 indicative of an overall software update level. For instance, the relative update level may increase across vehicle ECUs 104 for each version update or set of version updates to the vehicle ECUs 104, such as all initial vehicle ECU 104 software versions are set to level A, an update to one vehicle ECU 104 is set to level B, an update to another vehicle ECU 104 is set to level C to indicate that it is now the most recent update, and so on. In other example, the module token 206 may include a specific version number of the software (e.g., version 3.21). In yet other examples, the module token 206 may indicate a timestamp, e.g., of when the software was compiled or signed, which may accordingly be used to identify which update is the most recent.

The module compatibility matrix 208 may include information indicative of which software updates 104 are compatible with the current software level of the vehicle ECU 104 storing the module compatibility matrix 208. In an example, the module compatibility matrix 208 may include a listing of module IDs 204 of other vehicle ECUs 104, where for each module ID 204, the module compatibility matrix 208 includes a listing of compatible module tokens 206 for the associated other vehicle ECUs 104. For instance, the illustrated module compatibility matrix 208 indicates that the vehicle ECU 104 is compatible with the version "A" module token 206 of module ID 204 "Mod_1", with the version "B" module token 206 of module ID 204 "Mod_2", and with any of versions "A", "B" and "C" of module ID 204 "Mod_3".

When installing software updates 116 to the vehicle 102, the vehicle ECUs 104 may be configured to execute the MMCF logic 210 to determine which software updates 116 are compatible for installation to the vehicle 102. For example, responsive to the vehicle ECUs 104 receiving, over the vehicle bus 106, an indication from the software update management module 112 invoking the software update mode, the vehicle ECUs 104 may provide their current module ID 204 and module token 206 to the other vehicle ECUs 104 over the vehicle bus 106. In the case of a vehicle ECU 104 to which the software update 116 is to be installed, that vehicle ECU 104 may provide the module token 206 indicative of the version of the software update 116 to be installed or activated.

The vehicle ECU 104 that determines it has the most up-to-date module token 206 may utilize its module compatibility matrix 208 to validate the software configuration of the vehicle 102. Using its module compatibility matrix 208, and the received module IDs 204 and associated module tokens 206 from the other vehicle ECUs 104, the MMCF logic 210 of the most up-to-date vehicle ECU 104 determines whether the downloaded software update 116 is compatible with the software version levels of the vehicle ECUs 104. The other vehicle ECUs 104 may accordingly wait on the determination.

If the configuration is deemed to be compatible, then the MMCF logic 210 may generate a configuration compatibility result 212 indicative of whether the software versions vehicle ECUs 104 are compatible. The MMCF logic 210 may further provide the configuration compatibility result 212 to the other vehicle ECUs 104 via the vehicle bus 106. For example, the compatibility result 212 may indicate that (i) the configuration is compatible, that (ii) the configuration is incompatible regardless of whether further updates are installed, or (iii) that the configuration is incompatible but would be compatible if further updates are installed.

If the configuration is deemed to be compatible if further updates are installed, then the MMCF logic 210 may also generate an indication of modules to update 214. The indication of modules to update 214 may include a listing of one or more module IDs 204 of vehicle ECUs 104 to be updated. In many examples, the modules to update 214 may further include for each module IDs 204, a listing of indications of the module tokens 206 that would be compatible if installed. In cases where more than one module token 206 may be allowable, the MMCF logic 210 may elect to choose the most recent allowable module token 206.

In some vehicle 102 systems, installation of a software update 116 may require the vehicle 102 to be inoperable, as the storage devices (e.g., a flash memory) utilized by the vehicle ECUs 104 to maintain the executed software cannot both operate and be re-flashed with the software update 116 at the same time. However, in some cases the vehicle ECUs 104 may include multiple storage areas, such that a software update 116 may be installed to one storage area of the vehicle ECU 104 and verified by the MMCF logic 210 while a current version of the software may be executed from another storage area of the vehicle ECU 104.

Figure 3A:
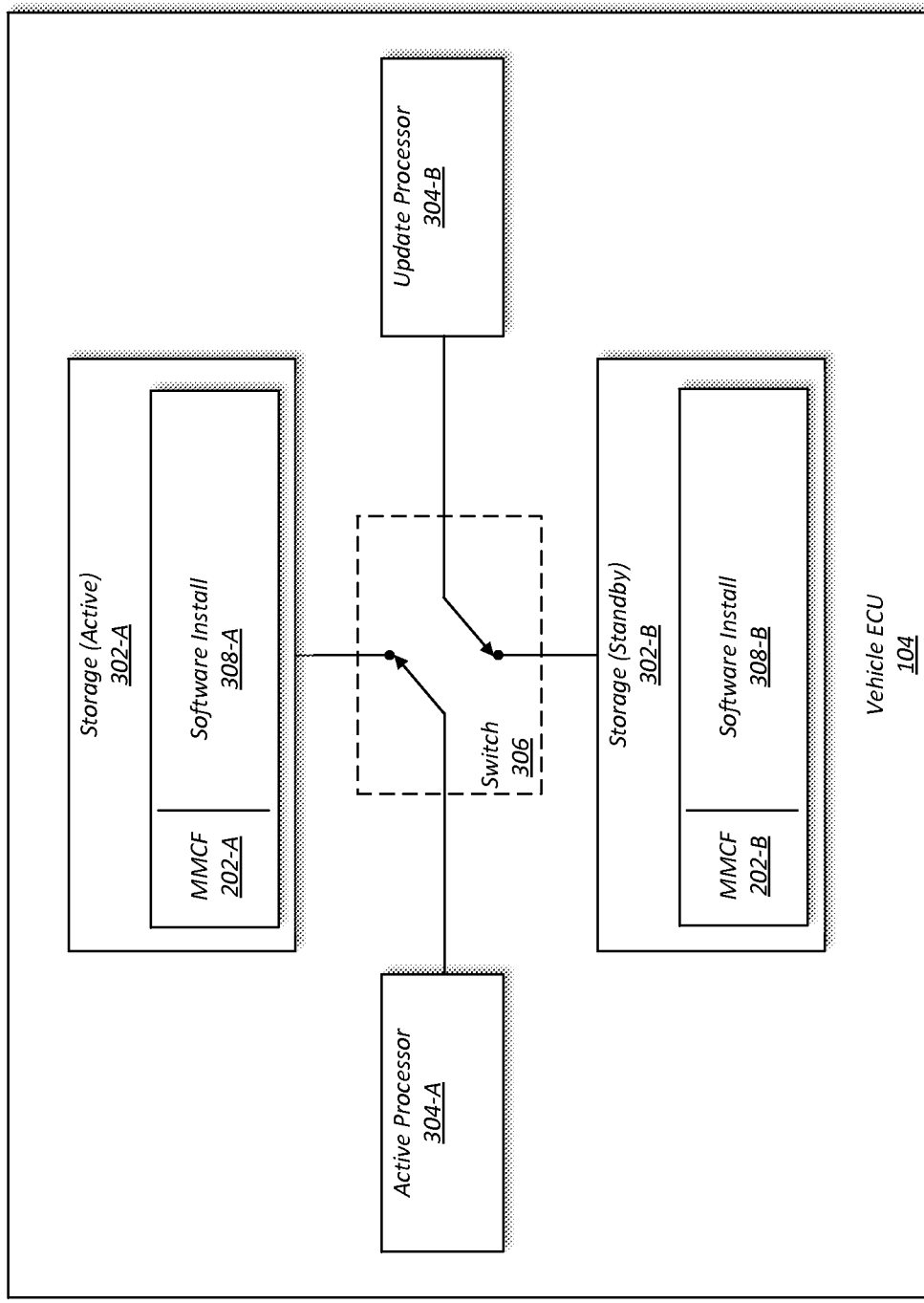
FIGS. 3A and 3B illustrate examples of the programmable memories for installation of software updates to a vehicle ECU.
Figure 3B:
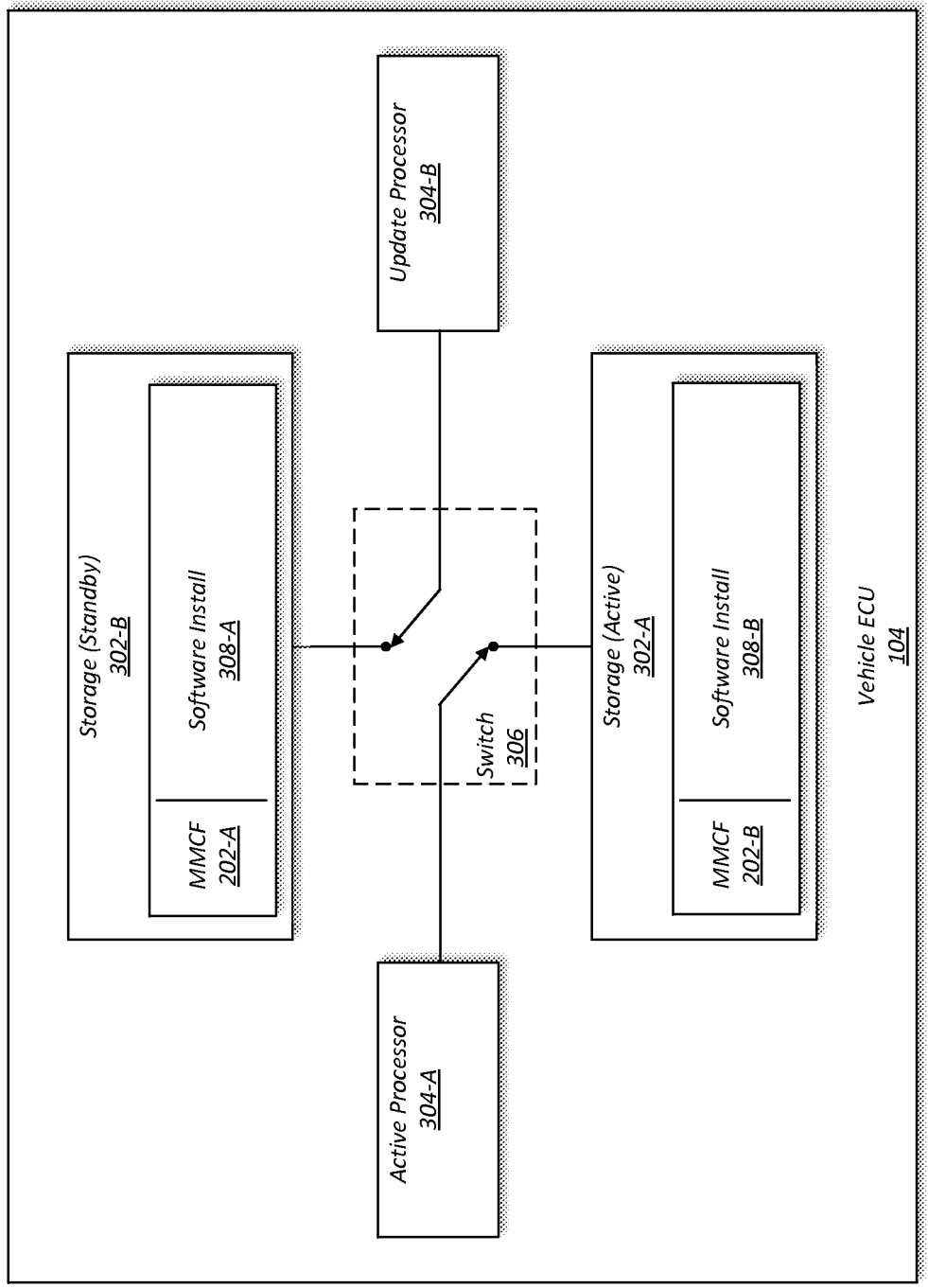

FIG. 3A illustrates an example of the programmable memory circuit 300 for a vehicle ECU 104 having multiple storage 302 areas. As shown, the programmable memory circuit 300 may include an active storage 302-A, an inactive storage 302-B, an active processor 304-A, an update processor 304-B, and a switch 306. The active storage 302-A may include a software install 308-A including a MMCF 202-A, and the inactive storage 302-B may include a software install 308-B including a MMCF 202-B. In a first state of the switch 306 (as shown in FIG. 3A), the active processor 304-A may be coupled to the active storage 302-A, and the update processor 304-B may be coupled to the inactive storage 302-B. In a second state of the switch 306 (as shown in FIG. 3B), the switch 306 may reverse which storage 302 is the active storage 302-A, and which storage 302 is the inactive storage 302-B. Accordingly, in the second state of the switch 306, active processor 304-A may be coupled to what was formerly the inactive storage 302-B as the new active storage 302-A, and the update processor 304-B may be coupled to what was formerly the active storage 302-A as the new inactive storage 302-B. Thus, by toggling of the switch 306, the programmable memory circuit 300 may switch which of the software installs 308-A or 308-B is to be executed by the active processor 304-A.

For instance, the vehicle ECU 104 may utilize the active processor 304-A to execute the software install 308-A installed to the active storage 302-A for vehicle 102 operation, while utilizing the update processor 304-B to install the software update 116 as the software install 308-B of the inactive storage 302-B. In such an example, when performing the MMCF verification of the vehicle software compatibility, the update processor 304-B of the vehicle ECU 104 may utilize the module token 206 of the MMCF 202-B of the software install 308-B when providing version information for the validation. Moreover, while the software validation is taking place, the vehicle ECU 104 may continue to utilize the active processor 304-A coupled to the storage 302-A to continue to execute the software install 308-A without interruption.

When the vehicle ECU 104 having installed the software update 116 to the inactive storage 302-B receives the configuration compatibility result 212 indicating that the software update 116 installed to the to the inactive storage 302-B is compatible, that vehicle ECU 104 may be configured to toggle the switch 306 to cause the inactive storage 302-B to become the new active storage 302-A, and for the current active storage 302-A to become the new inactive storage 302-B. This toggling of the switch 306 may be performed at the next initialization event for the vehicle 102. The initialization event may include, as some non-limiting examples, vehicle key-on, vehicle key-off, and/or a vehicle ECU 104 re-initialization event.

When, however, the configuration compatibility result 212 indicates a listing of additional modules to update 214, the software update module 112 may be configured to request those additional software updates 116, and to provide those additional software updates 116 to the vehicle ECUs 104 indicated as requiring the updates. Those additional software updates 116 may similarly be installed to the inactive storages 302-B of the vehicle ECUs 104 to be updated, and the MMCF process may continue until a successful configuration compatibility result 212 is achieved.

Accordingly, by determining whether the software levels installed to the vehicle ECUs 104 are compatible, the potential issues of unauthorized software updates 116, interrupted software updates 116 and basic flashing errors may be avoided. Moreover, as the vehicle 102 may validate the whole collection of vehicle ECUs 104 software levels for compatibility before switching the software updates 116 into active use on the vehicle 102, only approved combinations of software may be utilized by the vehicle 102, and any missed updates for a vehicle ECU 104 may be automatically addressed.

Figure 4:
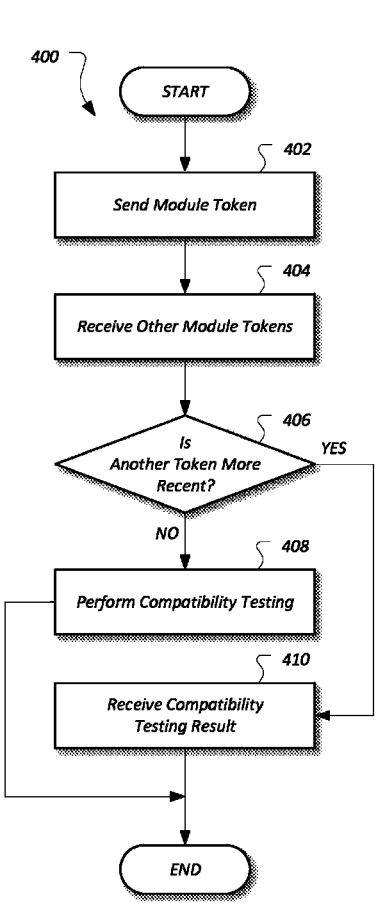
FIG. 4 illustrates an example process for determining which vehicle ECU to use to validate compatibility of the software update to be installed.

FIG. 4 illustrates an example process 400 for determining which vehicle ECU 104 to use to validate compatibility of the software update 116 to be installed. The process 400 may be performed, for example, by the vehicle ECUs 104 in communication over the vehicle bus 106.

At operation 402, the vehicle ECUs 104 send module tokens 206 over the vehicle bus 106. In an example, responsive to the vehicle ECUs 104 receiving an indication from the software update management module 112 over the vehicle bus 106 invoking the software update mode, the vehicle ECUs 104 may provide their current module ID 204 and module token 206 to the other vehicle ECUs 104 over the vehicle bus 106. For instance, the vehicle ECUs 104 for which software updates 116 have been installed to inactive storage 302-B may provide the module ID 204 and module token 206 from the MMCF 202-B of the software install 308-B to the inactive storage 302-B. At operation 404, the vehicle ECUs 104 accordingly receive module tokens 206 from the other vehicle ECUs 104 over the vehicle bus 106.

At operation 406, the vehicle ECUs 104 determine whether they have received another module token 206 that is more up-to-date than the module token 206 of the vehicle ECU 104 itself. In an example, if a vehicle ECU 104 determines that it has the most up-to-date module token 206, then that vehicle ECU 104 may determine that it should utilize its module compatibility matrix 208 to validate the software configuration of the vehicle 102. If the vehicle ECU 104 determines that it is the most up-to-date, control passes to operation 408 to perform the compatibility testing. Otherwise, control passes to operation 410 to allow another of the ECUs 104 to perform the compatibility testing.

At operation 408, the vehicle ECU 104 performs compatibility testing of the module tokens 206. Further aspects of the compatibility testing are discussed detail below with respect to process 500.

At operation 410, the vehicle ECU 104 receives a configuration compatibility result 212 from the vehicle ECU 104 performing the compatibility testing. For example, the other vehicle ECUs 104 may receive the configuration compatibility result 212 from the vehicle ECU 104. Based on the configuration compatibility result 212, the recipient vehicle ECU 104 may determine whether it should switch to active use any pending software updates 116 that the vehicle ECU 104 may have stored to inactive storage 302-B. After operation 410, the process 400 ends.

Figure 5:
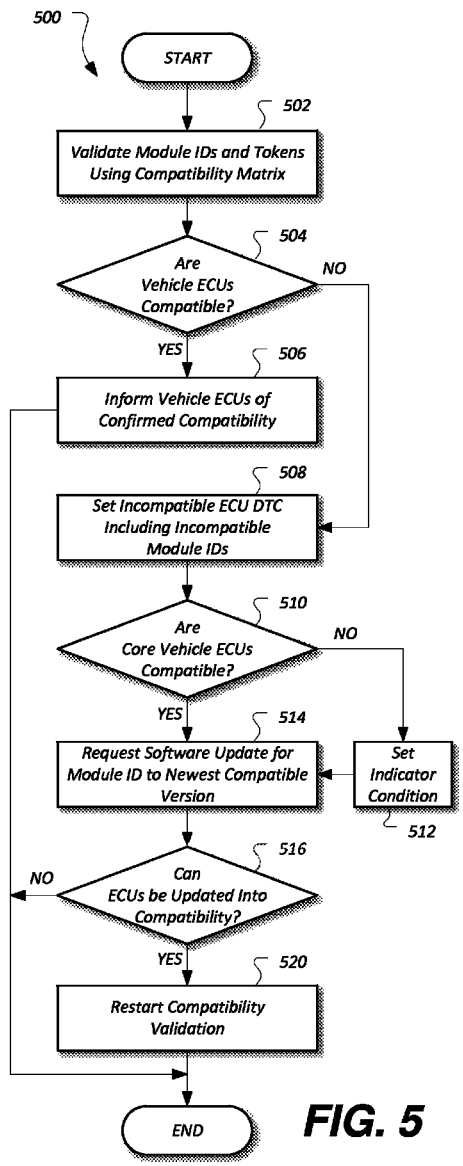
FIG. 5 illustrate an example process for installing a software update to a vehicle.

FIG. 5 illustrate an example process 500 for installing a software update 116 to a vehicle 102. As with the process 400, the process 500 may be performed, for example, by the vehicle ECUs 104 in communication over the vehicle bus 106.

At operation 502, the vehicle ECU 104 validates the received module IDs 204 and associated module tokens 206 using the module compatibility matrix 208. In an example, the validation may be performed by the MMCF logic 210 of the MMCF 202 of the most up-to-date vehicle ECU 104.

At operation 504, the vehicle ECU 104 determines whether the vehicle 102 configuration is compatible. In an example, the MMCF logic 210 may utilize the module compatibility matrix 208 to any received module IDs 204 that provided module tokens 206 that are incompatible with the software version levels of the vehicle ECUs 104. If no incompatibilities are identified, control passes to operation 506. Otherwise, control passes to operation 508.

At operation 506, the vehicle ECU 104 informs the vehicle ECUs 104 of the compatibility. The MMCF logic 210 may direct the vehicle ECU 104 to send a configuration compatibility result 212 over the vehicle bus 106 indicative that the vehicle configuration is deemed to be compatible. In an example, the vehicle ECUs 104 for which software updates 116 have been installed to inactive storage 302-B may set to toggle their switches 306 upon the next initialization event to activate the updated validated software configuration. After operation 506, the process 500 ends.

At operation 508, the vehicle ECU 104 informs the vehicle ECUs 104 of the incompatibility. In an example, the MMCF logic 210 may direct the vehicle ECU 104 to send a configuration compatibility result 212 over the vehicle bus 106 indicative that the vehicle configuration is deemed to be incompatible.

At operation 510, the vehicle ECU 104 further determines whether the core vehicle ECUs 104 form a compatible configuration. For example, a subset of vehicle ECUs 104 may be identified by the MMCF logic 210 as being required to be at compatible versions, while the remainder of the vehicle ECUs 104 being at incompatible versions may generate a warning or alert, but may be allowed to occur. In an example, the core vehicle ECUs 104 may include the engine control ECU 104-A and the transmission control ECU 104-B. In another example, if the vehicle 102 is a hybrid, the core vehicle ECUs 104 may additionally include a battery control ECU 104.

At operation 512, the vehicle ECU 104 sets an indicator condition. The indicator condition may be configured to inform the driver of the software incompatibility. In an example, the indicator condition may be provided to the user by way of the malfunction indicator light and/or a warning chime controlled via the HMI ECU 104-H.

At operation 514, the vehicle ECU 104 requests software updates 116 for the vehicle ECUs 104 determined to be incompatible with vehicle software configuration. In an example, the vehicle ECU 104 may determine an indication of modules to update 214 including a listing of one or more module IDs 204 of vehicle ECUs 104 to be updated, and may provide the information to the software update module 112 via the vehicle bus 106. The software update module 112 may accordingly request the desired software updates 116 from the update server 120 via the telematics control unit 108, and may provide the additional software updates 116 to the targeted vehicle ECUs 104 for installation.

At operation 516, the vehicle ECU 104 determines whether software updates 166 may be able to update the vehicle ECUs 104 into compatibility. For example, if the vehicle ECU 104 determines an indication of modules to update 214, then control passes to operation 518. Otherwise, the process 500 ends.

At operation 518, the vehicle ECU 104 restarts the software compatibility validation. For example, the vehicle ECU 104 may return to the process 400 to determine which vehicle ECU 104 should perform the renewed compatibility test. Accordingly, the vehicle ECU 104 may signal for the software configuration updated at operation 514 to be validated to ensure that this new configuration is compatible before putting the software updates 116 into active use on the vehicle 102. After operation 516, the process 500 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A system comprising:
a vehicle electronic control unit (ECU) of a plurality of ECUs configured to
receive, from the other vehicle ECUs, identifiers of the ECUs and tokens indicating overall vehicle update levels for the ECUs that increase across the vehicle ECUs for each update or set of updates to the vehicle ECUs; and if the ECU is the most up-to-date per the tokens, determine a result indicative of compatibility of the identifiers and tokens.

2. The system of claim 1, wherein the ECU is further configured to:
maintain a compatibility matrix indicating which tokens and module identifiers form a compatible vehicle software installation, and
utilize the compatibility matrix to determine the compatibility result.

3. The system of claim 1, wherein the ECU is further configured to:
receive the tokens over a vehicle bus; and
one of (i) send, over the vehicle bus, the compatibility result responsive to determining the compatibility result, and (ii) receive, over the vehicle bus, the compatibility result from the ECU that is the most up-to-date.

4. The system of claim 1, wherein the ECU is further configured to at least one of:
determine the compatibility result as indicative of an allowable configuration when a core subset of vehicle ECUs form a compatible configuration although other vehicle ECUs are incompatible; and
determine the compatibility result as indicative of an impermissible configuration when a core subset of vehicle ECUs fail to form a compatible configuration.

5. The system of claim 4, wherein the core subset of vehicle ECUs includes at least two of: (i) an engine control module, (ii) a transmission control module, and (iii) a hybrid battery control module.

6. The system of claim 1, wherein the vehicle is further configured to set a malfunction indicator light when the compatibility result is indicative of an impermissible configuration.

7. The system of claim 1, wherein the tokens include timestamp values corresponding to when software installed to the vehicle ECUs was compiled or signed.

8. A method comprising:
performing software update compatibility testing for a received software update using a most up-to-date vehicle electronic control unit (ECU) to determine a compatibility result, the most up-to-date vehicle ECU being determined using tokens from other vehicle ECUs indicating respective overall software update levels of the vehicle ECUs that increase across the vehicle ECUs for each version update or set of version updates to the vehicle ECUs; and
switching the software update into active use on the vehicle when the compatibility result indicates an allowable configuration with the software update installed.

9. The method of claim 8, further comprising:
maintaining, at each vehicle ECU, a compatibility matrix indicating module identifiers of each vehicle ECU and associated tokens that form a compatible vehicle software installation; and
utilizing the compatibility matrix of the most up-to-date vehicle ECU to determine the compatibility result based on the tokens and the module identifiers of the vehicle ECUs.

10. The method of claim 8, further comprising:
receiving, by one of the vehicle ECUs, the tokens from other of the vehicle ECUs;
determining, by the one of the vehicle ECUs, whether the one of the vehicle ECUs is a most up-to-date ECU based on the tokens; and
if so, determine the compatibility result by the one of the vehicle ECUs, and otherwise, receive the compatibility result from the vehicle ECU that is the most up-to-date.

11. The method of claim 10, further comprising:
receiving the tokens over a vehicle bus; and
one of (i) sending, over the vehicle bus, the compatibility result responsive to determining the compatibility result, and (ii) receiving, over the vehicle bus, the compatibility result from the ECU that is the most up-to-date.

12. The method of claim 8, further comprising at least one of:
determining the compatibility result as indicative of an allowable configuration when a core subset of vehicle ECUs form a compatible configuration although other vehicle ECUs are incompatible; and
determining the compatibility result as indicative of an impermissible configuration when a core subset of vehicle ECUs fail to form a compatible configuration.

13. The method of claim 12, wherein the core subset of vehicle ECUs includes at least two of: (i) an engine control module, (ii) a transmission control module, and (iii) a hybrid battery control module.

14. The method of claim 8, further comprising setting a malfunction indicator light when the compatibility result is indicative of an impermissible configuration.

15. A non-transitory computer-readable medium comprising instructions that, when executed by at least one processor, are configured to cause the at least one processor to:
maintain a compatibility matrix indicating module identifiers of vehicle electronic control units (ECUs) and associated tokens that form a compatible vehicle software installation;
receive, by a vehicle ECU, tokens from other vehicle ECUs indicating respective overall vehicle software version levels of the other vehicle ECUs that increase across the vehicle ECUs for each version update or set of version updates to the vehicle ECUs;
determine whether the vehicle ECU is the most up-to-date ECU of the vehicle ECUs based on the tokens; and
if so, determine a compatibility result indicative of compatibility of the version levels according to the tokens and the compatibility matrix, or otherwise, receive the compatibility result from the other vehicle ECU that is the most up-to-date.

16. The computer-readable medium of claim 15, further comprising instructions configured to cause the at least one processor to:
receive the tokens over a vehicle bus; and
one of (i) send, over the vehicle bus, the compatibility result responsive to determining the compatibility result, and (ii) receive, over the vehicle bus, the compatibility result from the ECU that is the most up-to-date.

17. The computer-readable medium of claim 15, further comprising instructions configured to cause the at least one processor to at least one of:
   determine the compatibility result as indicative of an allowable configuration when a core subset of vehicle ECUs form a compatible configuration although other vehicle ECUs are incompatible; and
   determine the compatibility result as indicative of an impermissible configuration when a core subset of vehicle ECUs fail to form a compatible configuration.

18. The computer-readable medium of claim 17, wherein the core subset of vehicle ECUs includes at least two of: (i) an engine control module, (ii) a transmission control module, and (iii) a hybrid battery control module.

19. The computer-readable medium of claim 17, further comprising instructions configured to cause the at least one processor to:
   receive a software update to be installed to a vehicle ECU;
   performing the compatibility testing responsive to receipt of the software update; and
   switch the software update into active use on the vehicle when the compatibility result indicates an allowable configuration of software version levels.

20. The computer-readable medium of claim 19, wherein the software update includes an updated version of ECU software, a token indicating a software version of the ECU software, and an updated compatibility matrix for the ECU indicating tokens and module identifiers of vehicle ECUs that form a compatible vehicle software installation.

* * * * *